Aug. 11, 1936.  L. W. HICKS  2,050,792
LESPEDEZA THRESHER
Filed April 1, 1936   2 Sheets-Sheet 1
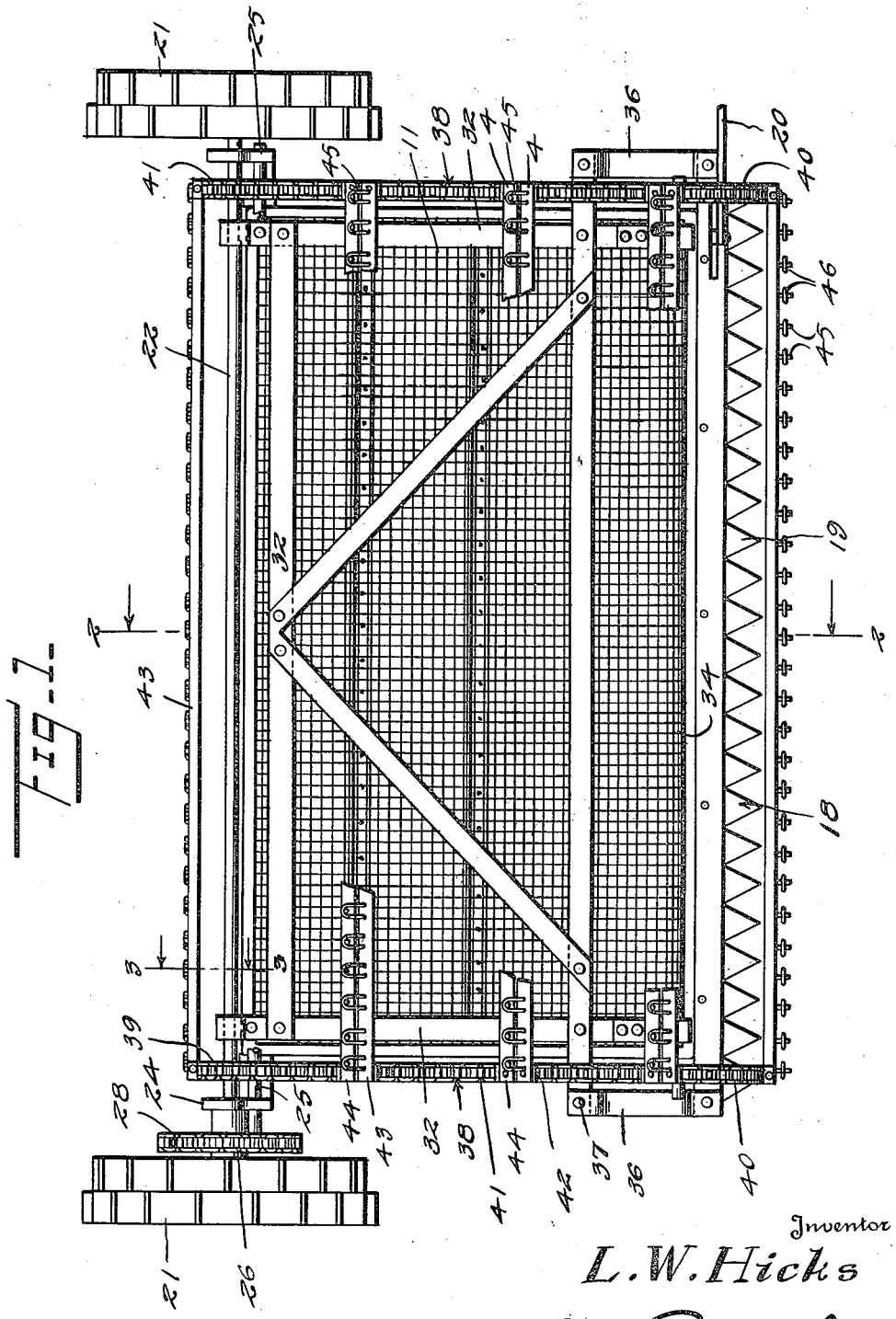
Inventor
L. W. Hicks Aug. 11, 1936.   L. W. HICKS   2,050,792
LESPEDEZA THRESHER
Filed April 1, 1936   2 Sheets-Sheet 2
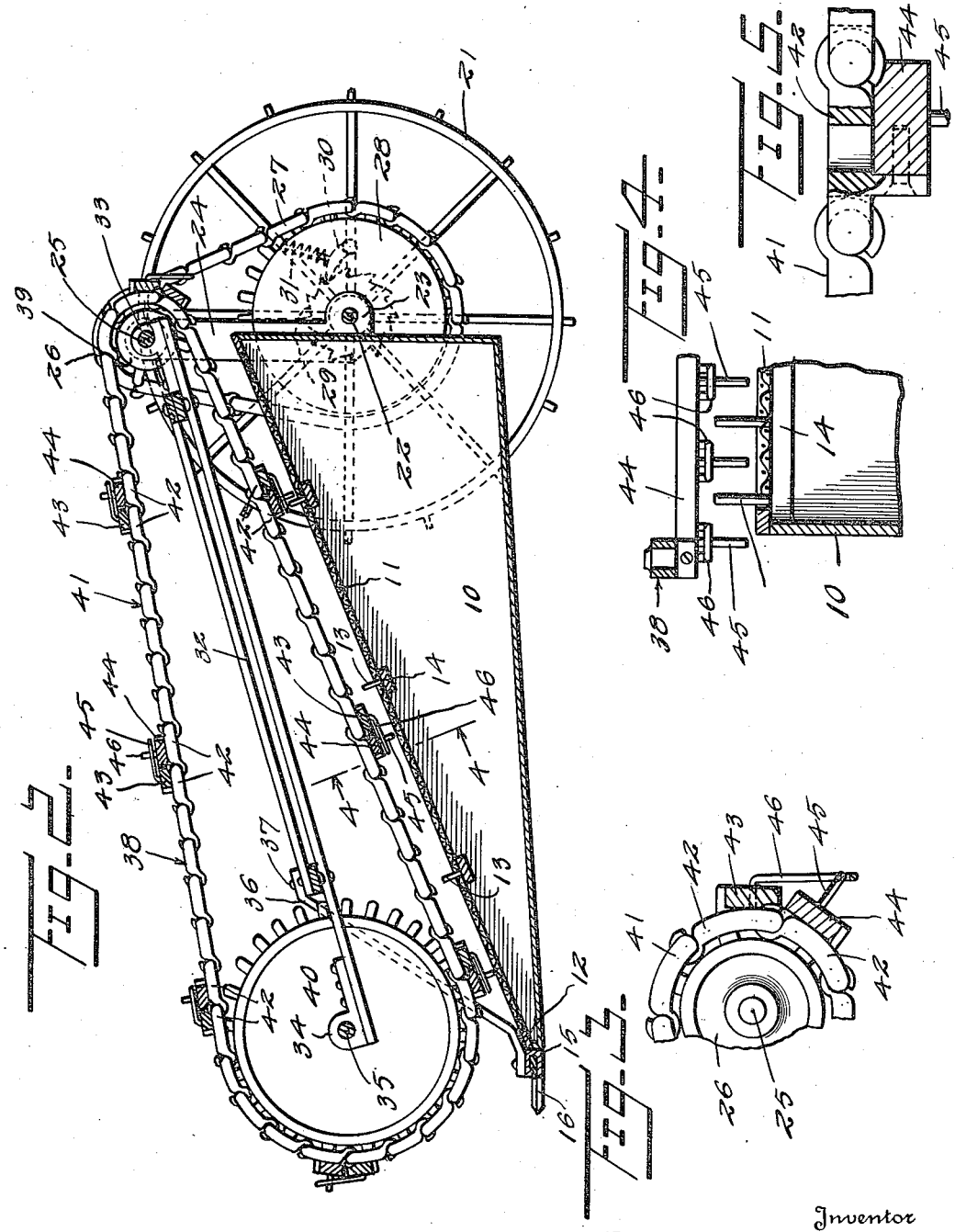

Patented Aug. 11, 1936

2,050,792

UNITED STATES PATENT OFFICE 2,050,792

LESPEDEZA THRESHER

Lawrence W. Hicks, Troutmans, N. C.

Application April 1, 1936, Serial No. 72,203

6 Claims. (Cl. 56—207)

This invention relates to a machine primarily adapted for threashing the seed from lespedeza or other crops and it particularly aims to provide a novel construction wherein the threshing of the seed is accomplished over a collecting pan carried by the thresher, to minimize the requirements and expense of labor necessary under existing conditions.

It is further aimed to provide a novel structure which is self-cleaning of the hay resulting from the threshing operation.

It is further aimed to provide a novel structure wherein the threshing mechanism may be swung to the rear to expose the sieve, so that the latter may be removed or displaced to permit removal of the seed.

The more specific objects and advantages will become apparent from a consideration of the description following taken in connection with accompanying drawings illustrating an operative embodiment.

In said drawings:—

Figure 1 is a plan view of the thresher;

Figure 2 is a vertical transverse sectional view taken on the line 2—2 of Figure 1;

Figure 3 is a detail section taken on the line 3—3 of Figure 1;

Figure 4 is a detail section taken on the line 4—4 of Figure 2, and

Figure 5 is a detail longitudinal sectional view taken through a part of the endless conveyor.

Referring specifically to the drawings wherein like reference characters designate like or similar parts, the threshing machine is adapted to travel over the field drawn or propelled in any suitable manner as by attachment to one side of a suitable vehicle.

The thresher has a suitable collecting pan for the threshed seed at 10 which is generally triangular in shape and open at the top which is covered by an inclined sieve 11 of any suitable mesh, removably connected in any desired manner to the top of such pan. The sieve 11 is preferably surrounded by a rigid marginal frame 12 and the sieve is impaled by projections 13 rising from cross-bars 14 spanning the top of the pan. The sieve thus removably engages the projections 13.

The lower forward end of the pan is adapted to travel along the ground and at such end, a transverse channel-bar 15 is fastened, the same having fixed triangular spaced mower teeth 16 over which slides a sickle bar 18 having teeth 19 of the same shape coacting with the teeth 16. The sickle-bar 18 is adapted to be reciprocated in any suitable manner by mechanism 20, for instance operated by the vehicle which draws the thresher along. Such sickle bar 18 is guided by the channel-bar 15 and operatively positioned by the latter.

A pair of ground wheels are provided at 21 at the rear of the pan 10, which ground wheels 21 are rigid on a transverse shaft 22 which is thus driven through the rotation of the ground wheels. Bearings at 23 are provided on the rear wall of pan 10 in which shaft 22 is journaled and supports 24 rise rigidly from the pan at opposite sides thereof at the rear end.

Said supports or brackets 24 journal a transverse shaft 25 which has a sprocket wheel 26 thereon, traversed by a sprocket chain 27, driven by a sprocket wheel 28 which is loose on the shaft 22 and which is driven by the shaft 22 so when the thresher travels forwardly, thence a ratchet wheel 29 rigid with shaft 22 is engaged by a pawl 30, pivoted to the sprocket wheel 28 and normally maintained in operative relation to the ratchet wheel by an expansive spring 31 on the sprocket wheel 28.

A suitable thresher frame 32 of skeleton form as shown has bearings 33 at its rear end whereby it is pivotally mounted on the shaft 25 at the forward end, frame 32 has bearings 34 in which a transverse shaft 35 is journaled. Two or more rests 36 preferably inclined as shown are fastened as at 37 to the thresher frame 32 and the lower ends of such rests 36 merely contact and rest on the upper surface of the channel-bar 15, thus permitting the threshing mechanism as a whole to be lifted upwardly and rearwardly, swinging on the axis 25, to expose the seed pan 10 to the end that the sieve 11 may be removed to permit access to the seed in the pan for removal or inspection.

A suitable conveyor 38 traverses a pair of sprocket wheels 39 keyed to the shaft 25 and a pair of sprocket wheels 40 keyed to the shaft 35. Said conveyor 38 may comprise a pair of spaced apart chains of the sprocket type as at 41. At suitable intervals, adjacent links 42 of the chain 41 have cross-slats 43 and 44 attached thereto. The slats 44 have tines 45 projecting therefrom and through U-shaped tines 46 carried by the slats 43. The tines 45 and 46 engage the cut lespedeza, and move the same upwardly and rearwardly over the screen 11 and into contact with and past the projections 13, serving to agitate the same and cause the seed to drop onto the sieve 11 and through the same into the pan 10.

It will be realized that as the slats 43 and 44 move relatively to each other and especially in traversing sprockets 39, they serve to extricate or clean the hay from the same which drops at the rear of the machine.

It will be realized that the threshing mechanism as a whole may be swung upwardly and rearwardly on the axis 25 so that the sieve 11 may be removed to permit access to the seed.

Various changes may be resorted to provided they fall within the spirit and scope of the invention.

I claim as my invention:—

1. A thresher of the class described having a seed pan, a sieve across the top thereof, cross bars secured to the seed pan and supporting said sieve, projections on said cross bars impaling the sieve, threshing means movable across said top and co-acting with said projections to agitate material on the sieve, and mechanism mounting said threshing means for displacement to render said top accessible.

2. A threshing machine of the class described having a pan, a sieve across the top thereof, cross bars secured to the seed pan and supporting said sieve, projections on said cross bars impaling the sieve, an axle journaled on said pan, ground wheel means driving said axle, a second shaft journaled on said pan, a frame pivoted on the second shaft, a conveyor to move material over said pan, tines on said conveyor coacting with said projections to agitate the material, means to drive the conveyor from the second mentioned shaft, said conveyor having supporting means resting on said pan.

3. A threshing machine of the class described having a pan, an axle journaled on said pan, ground wheel means driving said axle, a second shaft journaled on said pan, a frame pivoted on the second shaft, a conveyor to move material over said pan, means to drive the conveyor from the second mentioned shaft, said conveyor having means resting on said pan, comprising rests, sickle mechanism at the forward end of the pan, guide means for the sickle mechanism on which said rests engage.

4. A threshing machine of the class described having a pan, an axle journaled on said pan, ground wheel means driving said axle, a second shaft journaled on said pan, a frame pivoted on the second shaft, a conveyor to move material over said pan, means to drive the conveyor from the second mentioned shaft, said conveyor having means resting on said pan, comprising rests, sickle mechanism at the forward end of the pan, guide means for the sickle mechanism on which said rests engage, a sieve across the top of said pan, projections on the pan extending through the sieve and removably mounting the latter, and tines on said conveyor to move the material over the sieve, said tines coacting with said projections to agitate or thresh the material.

5. A threshing machine of the class described having a pan, an axle journaled on said pan, ground wheel means driving said axle, a second shaft journaled on said pan, a frame pivoted on the second shaft, a conveyor to move material over said pan, means to drive the conveyor from the second mentioned shaft, said conveyor having means resting on said pan, comprising rests, sickle mechanism at the forward end of the pan, guide means for the sickle mechanism on which said rests engage, a sieve across the top of said pan, projections on the pan extending through the sieve and removably mounting the latter, and tines on said conveyor to move the material over the sieve, said tines coacting with said projections to agitate or thresh the material, adjacent slats on the conveyor movable relative to each other, each slat carrying a series of tines, one of said series of tines being of U-shape and having the other series of tines extending therethrough and relatively movable whereby the tines will be self-cleaning of hay.

6. A thresher of the class described having a sieve, a conveyor movable thereover, adjacent links of said conveyor having slats thereon, U-shaped tines on one of the slats, tines on the other slat fastened through the U-shaped tines, said tines being engageable with material to move it over the sieve and being relatively movable with the links.

LAWRENCE W. HICKS.